(No Model.)
W. GANO & J. S. STIMMEL.
CHECKREIN HOLDER.
No. 593,048. Patented Nov. 2, 1897.
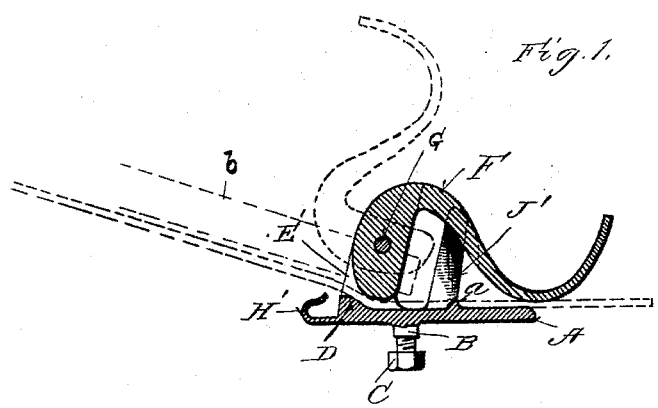
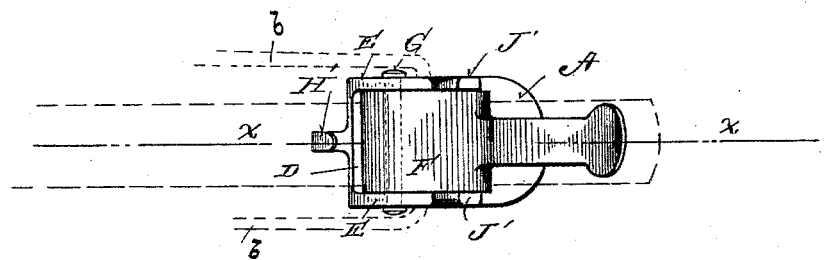
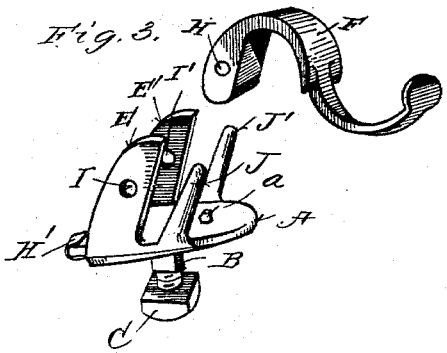
Witnesses
Jas. C. Dantry.
W. M. McNaw.
Inventors:
William Gano and James S. Stimmel,
By their Attorney
H. A. Toulmin

UNITED STATES PATENT OFFICE.

WILLIAM GANO AND JAMES S. STIMMEL, OF SPRINGFIELD, OHIO.

CHECKREIN-HOLDER.

SPECIFICATION forming part of Letters Patent No. 593,048, dated November 2, 1897.

Application filed March 17, 1897. Serial No. 627,960. (No model.)

*To all whom it may concern:*

Be it known that we, WILLIAM GANO and JAMES S. STIMMEL, citizens of the United States, residing at Springfield, in the county of Clark and State of Ohio, have invented certain new and useful Improvements in Checkrein-Holders, of which the following is a specification, reference being had therein to the accompanying drawings.

This invention relates to certain new and useful improvements in checkrein-holders used on harness for reining up the horse's head; and the peculiarities will be hereinafter fully described, and particularly pointed out in the claim.

In the accompanying drawings, on which like reference-letters indicate corresponding parts, Figure 1 is a vertical sectional view on the line $x\,x$ of Fig. 2. Fig. 2 is a plan view, and Fig. 3 is a detail perspective view of the parts disconnected.

The letter A represents the base-plate of my improved checkrein-holder, adapted to be secured to the saddletree of a harness backband in any suitable manner, but preferably by means of a screw-threaded shank B and its nut C, similar to the ordinary check-hook.

The letter D represents a raised portion on the base, cast or otherwise connected therewith, which assists in holding an overdrawcheck, as will more fully appear.

Ears or projections E E' extend upward from the base-plate A, between which fits a retaining member F, pivoted or hinged to a pin G, extending through the hole H in said retaining member and also through holes I I' in the ears or projections E E'. The said retaining member is pivoted somewhat eccentrically, so that when it is thrown forward, as shown by the dotted position in Fig. 1, the checkrein may readily be inserted beneath said member and between the ears E E'; but when it is thrown back, as shown in full lines, it impinges on the checkrein and forces it tightly against the base A and also bends the leather into the corner, as it were, formed by said base and its projection or raised portion D, which materially assists in holding said checkrein perfectly tight; but should the checkrein tend to slip we have provided a little lug or teat $a$, adapted to enter holes in the checkrein or in any other suitable manner engage therewith. Thus we have provided double security, which absolutely prevents the slipping of the checkrein when once the retainer member is in fastening position.

In order to prevent an ordinary side checkrein $b$ from becoming unchecked, we provide posts J J'. These posts prevent such a checkrein from slipping back far enough, as when the horse raises his head too high, to raise the retaining member. This is of great practical advantage in this style of check-holders.

A hook H' is secured to the forward end of the base-plate A for the purpose of holding the ordinary saddle-pad (not shown) by hooking its loop over said hook.

When it is desired to rein the horse, the retaining member is thrown forward, as shown in the dotted position in Fig. 1, and if an overdraw-checkrein is used (shown in the drawings) the end is slipped between the base and the retaining member to the desired tension, when said retaining member is thrown backward, as shown in full lines in Fig. 1, and its forward end firmly binds against said checkrein; but should a side checkrein be used it is placed between the ears E E' and the posts J J', when the retaining member is raised and is securely held within the slot formed between the ears and posts by said retaining member.

This device is cheaply manufactured and very efficient in practice and permits of quickly reining and unreining without the necessity of making the horse raise his head higher, which often is a source of great annoyance and loss of time.

Having thus fully described our invention, what we claim as new, and desire to secure by Letters Patent, is—

In a checkrein-holder, a base-plate, forward ears, one at each side of the plate, rear posts, one at each side of the plate and back of each ear, a retaining member consisting of a lever pivoted between said ears and extending beyond the post in both directions, the space between said forward ears and rear posts being adapted to receive a checkrein, and said ears to hold the rein under tension, and said posts to prevent the rein, when slackened while in use, from working back on the retaining member, and the lower projection of the retaining member downward from the pivot being adapted to partially disengage the checkrein from the ears.

In testimony whereof we affix our signatures in presence of two witnesses.

WILLIAM GANO.
JAMES S. STIMMEL.

Witnesses:
ALBERT K. HAHN,
JAMES P. GOODWIN.